United States Patent
Lee et al.

(10) Patent No.: US 11,418,548 B2
(45) Date of Patent: Aug. 16, 2022

(54) METHOD OF TRANSMITTING SECURITY INFORMATION OF SINGLE-BIT ADC WIRETAP CHANNEL

(71) Applicants: Daegu Gyeongbuk Institute of Science and Technology, Daegu (KR); POSTECH Research and Business Development Foundation, Pohang-si (KR)

(72) Inventors: Jemin Lee, Daegu (KR); Si-Hyeon Lee, Pohang-si (KR); Seunghyun Nam, Ulsan (KR)

(73) Assignees: DAEGU GYEONGBUK INSTITUTE OF SCIENCE AND TECHNOLOGY, Daegu (KR); POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 263 days.

(21) Appl. No.: 16/747,185

(22) Filed: Jan. 20, 2020

(65) Prior Publication Data
US 2021/0006601 A1     Jan. 7, 2021

(30) Foreign Application Priority Data
Jul. 1, 2019     (KR) .......................... 10-2019-0078819

(51) Int. Cl.
*H04L 9/40*     (2022.01)
*H04L 27/18*     (2006.01)
*H04W 24/06*     (2009.01)

(52) U.S. Cl.
CPC ............ *H04L 63/30* (2013.01); *H04L 27/186* (2013.01); *H04W 24/06* (2013.01)

(58) Field of Classification Search
None
See application file for complete search history.

(56) References Cited

U.S. PATENT DOCUMENTS

| | | | |
|---|---|---|---|
| 2004/0151109 A1* | 8/2004 | Batra | H04L 1/0071 370/208 |
| 2020/0119840 A1* | 4/2020 | Ebrahimzad | H04L 27/34 |

OTHER PUBLICATIONS

Leung-Yan-Cheong, et al., The Gaussian Wire-Tap Channel, IEEE Transactions on Information Technology, 1978, pp. 451-456.
(Continued)

*Primary Examiner* — Brandon Hoffman
(74) *Attorney, Agent, or Firm* — Hauptman Ham, LLP

(57) ABSTRACT

Provided is a method of transmitting security information of a single-bit analog-to-digital converter (ADC) wiretap channel. In the method of transmitting the security information of the single-bit ADC channel, a transmitting terminal adds additive noise to a transmission signal and transmits the transmission signal, and a receiving terminal and a wiretap terminal which each include a single-bit ADC receive the transmission signal, wherein received information is processed so as not to be determined by the wiretap terminal. When intensity of additive noise of the receiving terminal is less than that of additive noise of the wiretap terminal, a binary phase-shift keying (BPSK) distribution is used, and when the intensity of the additive noise of the receiving terminal is greater than that of the additive noise of the wiretap terminal, a codebook is designed using an asymmetric BPSK distribution in which both of two message points have a positive value.

4 Claims, 2 Drawing Sheets

(56) References Cited

OTHER PUBLICATIONS

Walden, Analog-to-Digital Converter Survey and Analysis, IEEE Journal on Selected Areas in Communications, 1999, pp. 539-550.
Korean Office Action dated Sep. 14, 2020, in connection with corresponding Korean Patent Application No. 10-2019-0078819.
Nam et al. "A Study on the Secrecy Rate of the Gaussian Wiretap Channel with One-bit ADCs" Proceedings of Symposium of the Korean Institute of communications and Information Sciences, Jun. 2019. pp. 55-56, with English Abstract, Claiming Exception to Loss of Novelty.

* cited by examiner

METHOD OF TRANSMITTING SECURITY INFORMATION OF SINGLE-BIT ADC WIRETAP CHANNEL

CROSS-REFERENCE TO RELATED APPLICATION

This application claims priority to and the benefit of Korean Patent Application No. 2019-0078819, filed on Jul. 1, 2019, the disclosure of which is incorporated herein by reference in its entirety.

BACKGROUND

1. Field of the Invention

The present invention relates to a method of transmitting security information of a single-bit analog-to-digital converter (ADC) wiretap channel, and more particularly, to a method of transmitting security information suitable for low power communication.

2. Discussion of Related Art

With the advent of computers and the development of digital signal processing technologies, data communication networks, through which data is exchanged between two or more data transmission and reception devices, have become popular.

In particular, in the present when data communication between individuals has become common, various types of digital data signals are transmitted.

A typical data communication network device interconnects a plurality of data transceivers with a data network through an associated interface.

A data communication network typically includes a bidirectional bus that provides a medium for transmitting data between data transceivers.

It is known that packet type data is transmitted for the above-described data communication.

The devices connected to the bus may include various data transceivers, such as large capacity computers, personal computers, intelligent and unintelligent terminals, digital station sets, smart phones, and the like.

Each of the devices is connected to a communication network through an interface. The interface processes transmission of packet data which is input and output between the devices.

Processing operations include processing such as determining transmission or reception of a data packet, controlling an access between buses, formatting and deformatting a packet data, and the like.

Typically, a device such as a terminal is connected to a single interface that performs and processes operations associated with transmission and reception of data.

However, a device that uses a single interface for an associated data transmission and reception device is expensive and inefficient.

Accordingly, devices have been developed that use a single interface in order to perform processing for a plurality of associated data transceivers.

Typically, shared interface devices are used in small offices where economic factors are important. For example, many unintelligent terminals which are each placed at employee's desks are connected to a bidirectional data packet bus through a single interface.

The above bus is connected to a host computer through an associated interface. The employee should have a terminal that accesses the host computer through a single interface. Therefore, all data transmissions between the terminals are processed through the single interface.

In a shared processing operation, any terminal user may monitor a current processing operation of an interface, detect transmission and reception of data, and intercept input or output data transmission.

Shared interfaces provide economic advantages. However, the shared interface has the largest disadvantage in that data being transmitted or received may be intercepted by any device connected to the interface.

Although a user's device is not a data generator for data transmission or a receiver for data reception, the user's device may wiretap data transmission.

Therefore, the above-described device may not securely transmit and receive valuable data between communication networks.

As described above, in digital data communication, there may be unlawful wire tappers in addition to legitimate recipients and thus various secure transmission techniques have been proposed to prevent wiretapping.

In a general communication system, a transmitting terminal encodes and transmits information to be transmitted and a receiving terminal decodes a received signal to figure out the transmitted information. When a codebook, which is made with an input distribution that achieves channel capacity, is used in decoding and encoding processes, communication may be performed at a transfer rate close to the channel capacity.

In order to securely transmit digital data from a transmitter to a receiver, when channel gains of a transmitting terminal and a receiving terminal are known, a general communication channel with fading may be treated equivalently to an additive white Gaussian noise (AWGN) channel.

In an equivalent AWGN channel, an input distribution that achieves channel capacity may be scaled according to a channel gain so that channel capacity of a general communication channel may be achieved.

In an AWGN wiretap channel, there is a high probability that a wiretap terminal may not figure out information transmitted by a transmitting terminal. A legitimate receiving terminal may obtain secure channel capacity, which is a maximum value of a transfer rate with which information may be found out and there is an input distribution that achieves the secure channel capacity.

In S. Leung-Yan-Cheong and M. Hellman, "The Gaussian wire-tap channel," in IEEE Transactions on Information Theory, vol. 24, no. 4, pp. 451-456, July 1978, it is described that, when intensity of noise of a legitimate receiving terminal in an AWGN wiretap channel is greater than that of noise of a wiretap terminal, capacity of a secure channel is zero and thus secure communication is impossible.

In a real digital communication environment, each receiver receives a received signal using an analog-to-digital (ADC) converter. The ADC consumes exponentially more power as the number of quantization bits increases. In a mobile environment, the number of quantization bits in the ADC is generally minimized to reduce power consumption.

In R. H. Walden, "Analog-to-digital converter survey and analysis," in IEEE Journal on Selected Areas in Communications, vol. 17, no. 4, pp. 539-550, April 1999, it is specifically described that an ADC consumes exponentially more power as the number of quantization bits increases.

Therefore, for low power communication, it is necessary to minimize the number of quantization bits in the ADC.

However, so far no research has been conducted on secure transmission in a single-bit ADC wiretap channel.

SUMMARY OF THE INVENTION

The present invention is directed to providing a method of transmitting security information in which secure transmission is possible in a wiretap channel in which a single-bit analog-to-digital converter (ADC) is applied according to power of additive noise of a legitimate receiving terminal and power of additive noise of a wiretap terminal.

According to an aspect of the present invention, there is provided a method of transmitting security information of an ADC wiretap channel. In the method of transmitting the security information of the single-bit ADC channel, a transmitting terminal adds additive noise to a transmission signal and transmits the transmission signal, and a receiving terminal and a wiretap terminal which each include a single-bit ADC receive the transmission signal, wherein received information is processed so as not to be determined by the wiretap terminal. When intensity of additive noise of the receiving terminal is less than that of additive noise of the wiretap terminal, a binary phase-shift keying (BPSK) distribution is used, and when the intensity of the additive noise of the receiving terminal is greater than that of the additive noise of the wiretap terminal, a codebook is designed using an asymmetric BPSK distribution in which both of two message points have a positive value.

When the intensity of the additive noise of the receiving terminal is less than that of the additive noise of the wiretap terminal, output power of the transmitting terminal may be defined by Equation 1 below.

$$p^* = \min\left\{P, \operatorname{argmax}_p\left[H\left(Q\left(\frac{\sqrt{p}}{n_2}\right)\right) - H\left(Q\left(\frac{\sqrt{p}}{n_1}\right)\right)\right]\right\}$$ [Equation 1]

Here, Q(x) denotes a decreasing function having a value of ½ when x is zero, H(y) denotes an increasing function, which has a maximum value when y=½ and increases in y∈[0,½], as an entropy function, N1 denotes the additive noise of the receiving terminal, N2 denotes the additive noise of the wiretap terminal, and P denotes a limited power value.

When the intensity of the additive noise of the receiving terminal is greater than that of the additive noise of the wiretap terminal, an output distribution of the transmitting terminal may be defined by Equation 2 below.

$$p1(x) = \begin{cases} \pi & \text{if } x = a \\ 1-\pi & \text{if } x = b \end{cases}, b > a > 0$$ [Equation 2]

Here, a and b denote positive message points.

In order to maximize a difference between amounts of pieces of information of the receiving terminal and the wiretap terminal, the message point b may be treated as a positive integer close to infinity.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
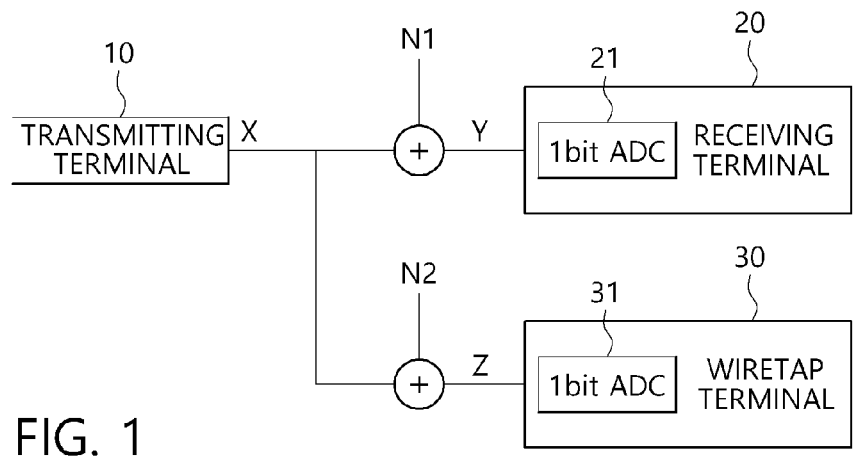
FIG. 1 is a block diagram of a communication system to which a method of transmitting security information of a single-bit analog-to-digital converter (ADC) channel is applied.

Hereinafter, various embodiments of the present invention will be described in detail with reference to the accompanying drawings. In this case, it should be noted that like reference numerals in the accompanying drawings denote like elements. The accompanying drawings of the present invention are provided to aid understanding of the present invention and it should be noted that the present invention is not limited to the form or arrangement illustrated in the drawings of the present invention. In addition, detailed descriptions of well-known functions and configurations that may unnecessarily obscure the gist of the invention will not be repeated. The following descriptions will be made focusing on configurations necessary for understanding operations according to various embodiments of the present invention. Therefore, descriptions of other configurations that might obscure gist of the present invention will be omitted.

In descriptions of the embodiments, descriptions of technical contents that are well known in the technical field to which the present invention belongs that are not directly related to the present invention will be omitted. This serves to convey the gist of the invention more clearly by omitting unnecessary descriptions.

For the same reason, in the accompanying drawings, some elements are exaggerated, omitted, or schematically illustrated. In addition, a size of each element does not fully reflect an actual size. The same or corresponding elements in each drawing are given the same reference numerals.

Advantages and features of the present invention and methods of achieving the same will be clearly understood with reference to the accompanying drawings and the following detailed embodiments. However, the present invention is not limited to the embodiments to be disclosed but may be implemented in various different forms. The embodiments are provided in order to fully explain the present invention and fully explain the scope of the present invention for those skilled in the art. The scope of the present invention is defined by the appended claims. Throughout this specification, like reference numerals denote like elements.

In this case, it will be appreciated that each block of flowcharts and combinations of flowcharts may be performed by computer program instructions. Since the computer program instructions may be embedded in a processor of a general purpose computer, special purpose computer, or other programmable data processing equipment, the instructions executed through the processor of the computer or other programmable data processing equipment generate a means for performing the functions described in the block(s) of flowchart. Since the computer program instructions may be stored in a computer usable or computer readable memory that can be directed to a computer or other programmable data processing equipment to implement functionality in a particular manner, the instructions stored in the computer usable or computer readable memory may produce a manufactured item containing an instruction means for performing the functions described in the block(s) of flowchart. Since the computer program instructions may also be installed in a computer or other programmable data processing equipment, instructions for performing a series of operating steps on a computer or other programmable data processing equipment to generate a computer-implemented process to be performed on the computer or other programmable data processing equipment may provide steps for performing the functions described in the block(s) of flowchart.

In addition, each block may represent a module, segment, or portion of code that includes one or more executable instructions for executing a specified logical function(s). It should also be noted that in some alternative implementations, the functions mentioned in the blocks may occur out of order. For example, two blocks illustrated in succession may in fact be executed substantially concurrently or the blocks may sometimes be executed in the reverse order, depending on the corresponding function.

In this case, terms described in the specification as "part" refer to software or a hardware component such as a field-programmable gate array (FPGA) or an application-specific integrated circuit (ASIC), and the part performs certain functions. However, the "part" is not limited to software or hardware. The "part" may be configured in a storage medium that may be addressed or may be configured to be executed by at least one processor. Therefore, examples of the "part" include components such as software components, object-oriented software components, class components and task components, and processes, functions, attributes, procedures, subroutines, segments of program codes, drivers, firmware, micro codes, circuits, data, database, data structures, tables, arrays, and variables. Components and functions provided from "parts" may be combined into a smaller number of components and "parts" or may be further separated into additional components and "parts."

In addition, the components and "parts" may be implemented to operate one or more central processing units (CPUs) in a device or a secure multimedia card.

FIG. 1 is a block diagram of a communication system to which a method of transmitting security information of a single-bit analog-to-digital converter (ADC) channel according to an exemplary embodiment of the present invention is applied.

Referring to FIG. 1, the communication system includes a transmitting terminal 10, a receiving terminal 20 which legitimately receives data of the transmitting terminal 10, and a wiretap terminal 30 which illegally receives the data of the transmitting terminal 10. At least the receiving terminal 20 and the wiretap terminal 30 each include single-bit ADCs 21 and 31.

The transmitting terminal 10 transmits data through a wireless channel, and the same data is received by each of the receiving terminal 20 and the wiretap terminal 30.

The transmitting terminal 10, the receiving terminal 20, and the wiretap terminal 30 may be communicable computing devices such as various mobile terminals.

The transmitting terminal 10 receives data through a wireless channel and each of the receiving terminal 20 and the wiretap terminal 30 which receive the data converts an analog signal into a digital signal using the ADC to restore the data.

In this case, both of the receiving terminal 20 and the wiretap terminal 30 receive the same data, but the receiving terminal 20 may enable the decoding of the data, and the wiretap terminal 30 may cause the decoding of the data to fail with a very high probability, thereby enabling secure transmission.

In a wireless communication process of the transmitting terminal 10, a communication channel has Gaussian noises N1 and N2, and the Gaussian noises received by the receiving terminal 20 and the wiretap terminal 30 may be different from each other.

In FIG. 1, a transmission signal of the transmitting terminal 10 is defined as X, a reception signal of the receiving terminal 20 is defined as Y, a reception signal of the wiretap terminal 30 is defined as Z, additive noise of the receiving terminal 20 is defined as N1, and additive noise of the wiretap terminal 30 is defined as N2.

In the present invention, different security techniques are used when intensity of the additive noise N1 of the receiving terminal 20 is less than that of the additive noise N2 of the wiretap terminal 30 and when intensity of the additive noise N1 of the receiving terminal 20 is greater than that of the additive noise N2 of the wiretap terminal 30.

First, a description will be given of a security technique when intensity of the additive noise N1 of the receiving terminal 20 is less than that of the additive noise N2 of the wiretap terminal 30.

When intensity of the additive noise N1 of the receiving terminal 20 is less than that of the additive noise N2 of the wiretap terminal 30, an input distribution using binary phase-shift keying (BPSK) is obtained.

A secure transfer rate Rs in this case may be defined by Equation 1 below.

$$Rs = I(X;Y) - I(X;Z)$$ [Equation 1]

In addition, the reception signal Y of the receiving terminal 20 may be defined by sgn(X+N1), and the reception signal Z of the wiretap terminal 30 may be defined by sgn(X+N2).

It is sufficient that the fact that a specific input distribution p(x) achieves a positive secure transfer rate means that a difference between amounts of pieces of mutual information, I(X;Y)−I(X;Z), which is the difference between the amounts of pieces of mutual information described above, has a positive value.

The input distribution p(x) of the transmitting terminal 10 is set by BPSK corresponding to a given maximum power limit P. It can be appreciated that the maximum power limit P is caused by the use of a single-bit ADC. The input distribution p(x) may be defined by Equation 2 below.

$$p(x) = 1/2, \text{ for } x = \sqrt{P}, -\sqrt{P}$$ [Equation 2]

An equation representing the difference between the amounts of pieces of mutual information using the given input distribution p(x) may be expressed by Equation 3 below.

$$I(X;Y) - I(X;Z) = H\left(Q\left(\frac{\sqrt{P}}{n_2}\right)\right) - H\left(Q\left(\frac{\sqrt{P}}{n_1}\right)\right)$$ [Equation 3]

In Equation 3, Q(x) denotes a decreasing function having a value of ½ when x is zero, and H(y) denotes an increasing function, which has a maximum value when y=½ and increases in y∈[0, ½], as an entropy function.

Using Equation 3, optimal BPSK of the transmitting terminal 10 may be obtained as shown in Equation 4 below.

$$p^* = \min\left\{P, \operatorname{argmax}_p \left[H\left(Q\left(\frac{\sqrt{p}}{n_2}\right)\right) - H\left(Q\left(\frac{\sqrt{p}}{n_1}\right)\right)\right]\right\} \quad \text{[Equation 4]}$$

As described above, when intensity of the noise N1 added to the receiving terminal 20 is less than that of the noise N2 of the transmitting terminal 10, optimal BPSK may be applied within a range of the limited power P so that the secure transfer rate of Equation 1 above may be achieved. In the above method, two message points have both of a positive value and a negative value relative to zero.

On the contrary, when intensity of the additive noise N1 of the receiving terminal 20 is greater than that of the additive noise N2 of the transmitting terminal 10, asymmetric BPSK is used in which both of two message points have positive values.

An input distribution p1(x) of a signal transmitted by the transmitting terminal 10 may be expressed by Equation 5 below.

$$p1(x) = \begin{cases} \pi & \text{if } x = a \\ 1 - \pi & \text{if } x = b \end{cases}, b > a > 0 \quad \text{[Equation 5]}$$

Figure 2:
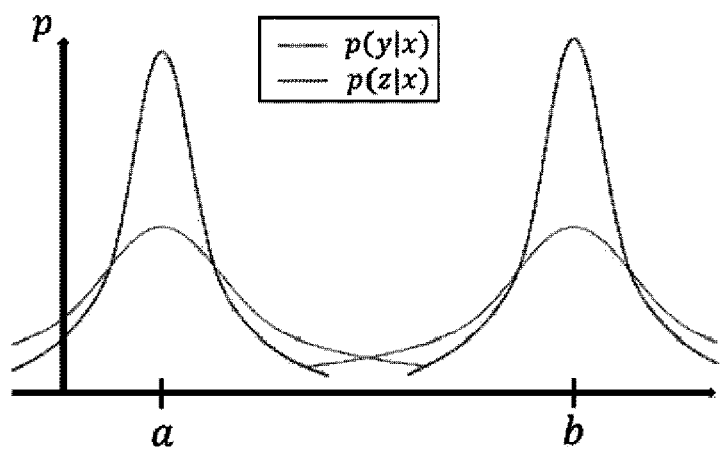
FIG. 2 is a distribution graph applied to the present invention.

When such an input distribution is used, a probability of achieving a positive secure transfer rate and a reception probability may be expressed as in the graph of FIG. 2.

In the above Equation 5, when x is b, a probability that both of Y and Z are one is high, and when x is a, Equation 6 below is satisfied.

$$p1(Y=-1;X=a) > p1(Z=-1;X=a) \quad \text{[Equation 6]}$$

In the above Equation 6, it can be seen that the signal received by the receiving terminal 20 distinguishes between two input symbols a and b better than the signal received by the wiretap terminal 30.

Figure 3:
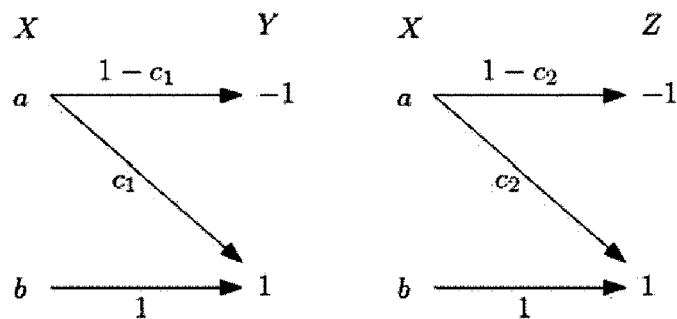
FIG. 3 illustrates diagrams of examples of channels formed between a transmitting terminal and a receiving terminal and between the transmitting terminal a wiretap terminal.

In this case, when b has an infinite value close to infinity in the above input distribution, channels are generated between the transmitting terminal 10 and the receiving terminal 20 and between the transmitting terminal 10 and the wiretap terminal 30 as illustrated in FIG. 3.

Referring to FIG. 3, crossing probabilities c1 and c2 may be expressed by Equation 7 below.

$$c_i = 1 - Q\left(\frac{a}{n_i}\right), i = 1, 2 \quad \text{[Equation 7]}$$

The amount of mutual information is represented by a decreasing function with respect to a crossing probability, and when N1>N2, a difference between the amounts of pieces of mutual information has a positive value. That is, when b is close to infinity, the difference between the amounts of pieces of mutual information may become a positive value and may be expressed by Equation 8 below.

$$\lim_{b \to \infty} I(X;Y) - I(X;Z) > 0 \quad \text{[Equation 8]}$$

Since the difference between the amounts of pieces of mutual information is a continuous function with respect to b, there exists a positive constant b which makes a secure transfer rate become a positive value for all a and $\pi$(pi).

The a, b, and $\pi$ obtained in this way may not satisfy the maximum power limit P. In this case, when communication is performed by setting a ratio of a time during which the transmitting terminal 10 transmits a signal to a total communication time and a time usage rate B, a positive secure transfer rate may be obtained while satisfying the maximum power limit.

A relationship between the above variables may be expressed by Equation 9 below.

$$B = \frac{P}{\pi a^2 + (1-\pi)b^2} \quad \text{[Equation 9]}$$

In the asymmetric BPSK obtained in this way, effects of the respective variables on a secure transfer rate may be analyzed by simulations.

A first method, which is a method of maximizing a secure transfer rate, is an example in which b of Equation 9 is determined by maximizing the secure transfer rate for a, b, and $\pi$ and then limiting the maximum power limit P to 0.01. The first method is represented by solid blue lines (Bursty opt) in FIG. 4.

A second method is a method in which the time usage rate B is fixed to 1 and maximized for a, b, and $\pi$. The second method is represented by solid red lines (Not Bursty opt).

A third method is a method in which a secure transfer rate is maximized for all possible combinations of a, b, $\pi$, and B. The third method is represented by solid yellow lines (Joint opt).

Figure 4:
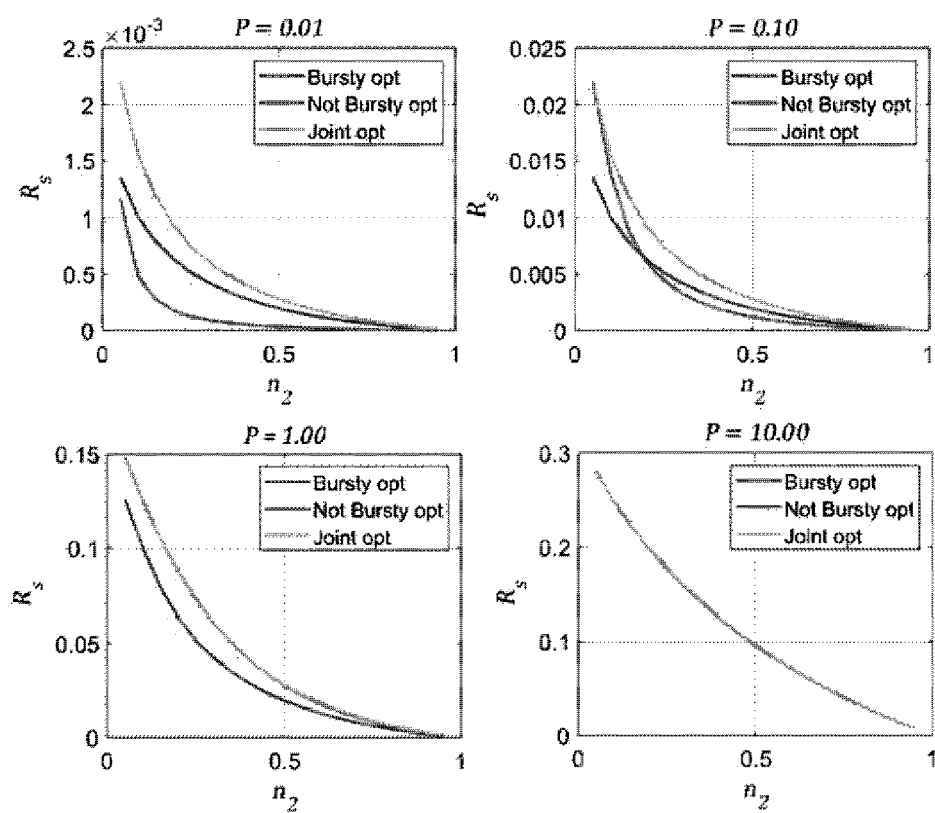
FIG. 4 illustrates graphs of simulation results of the present invention.

The additive noise N1 is fixed to one in all simulations. FIG. 4 shows four simulation results for the above three maximization methods and shows results obtained by converting a value of a maximum power limit P into 0.01, 0.1, 1, and 10 and simulating in each simulation.

When the maximum power limit is high, similar secure transfer rates are obtained in all three methods. As the maximum power limit decreases, performance in the first method decreases and then the performance in the second method rapidly decreases. Accordingly, it may be analyzed that, in a region in which the maximum power limit is low, the time use rate has a dominant influence on the secure transfer rate, and in a region in which the maximum power limit is high, it is optimal to set the time use rate to one and a value of the input symbol b has a dominant influence.

As described above, in the present invention, a positive secure transfer rate may be achieved by applying the BPSK or the asymmetric BPSK according to the intensity of the additive noises of the receiving terminal 20 and the wiretap terminal 30.

According to the present invention, in the method of transmitting the security information of the single-bit ADC channel, the codebook reflecting the BPSK or the asymmetric BPSK can be used according to the intensity of the additive noises of the receiving terminal and the wiretap terminal which each use the single-bit ADC, thereby enabling an additive white Gaussian noise (AWGN) channel communication with low power.

It will be apparent to those skilled in the art that the present invention is not limited to the above embodiments and may be variously modified and deformed without departing from the technical spirit of the present invention.

What is claimed is:

1. A method of transmitting security information of a single-bit analog-to-digital converter (ADC) channel, the method comprising:

transmitting, by a transmitting terminal, a transmission signal having additive noise;

receiving, by a receiving terminal having a single bit ADC, the transmission signal;

receiving, by a wiretap terminal having a single bit ADC, the transmission signal;

when a first intensity of additive noise included in the received signal of the receiving terminal is less than a second intensity of additive noise included in the received signal of the wiretap terminal, transmitting, by the transmitting terminal, the transmission signal using a binary phase-shift keying (BPSK) distribution; and when the first intensity of the additive noise of the receiving terminal is greater the second intensity of the additive noise of the wiretap terminal, transmitting, by the transmitting terminal, the transmission signal using an asymmetric BPSK distribution in which both of two message points have a positive value.

2. The method of claim 1, wherein, when the first intensity of the additive noise of the receiving terminal is less than the second intensity of the additive noise of the wiretap terminal, output power of the transmitting terminal is defined by Equation 1 below, $$p^* = \min\left\{P, \mathrm{argmax}_p\left[H\left(Q\left(\frac{\sqrt{p}}{n_2}\right)\right) - H\left(Q\left(\frac{\sqrt{p}}{n_1}\right)\right)\right]\right\}$$ [Equation 1]

here, $Q(x)$ denotes a decreasing function having a value of ½ when x is zero, $H(y)$ denotes an increasing function, which has a maximum value when y=½ and increases in y.di-elect cons.[0, ½], as an entropy function, N1 denotes the additive noise of the receiving terminal, N2 denotes the additive noise of the wiretap terminal, and P denotes a limited power value.

3. The method of claim 1, wherein, when the first intensity of the additive noise of the receiving terminal is greater than the second intensity of the additive noise of the wiretap terminal, an output distribution of the transmitting terminal is defined by Equation 2 below, $$p1(x) = \begin{cases} \pi & \text{if } x = a \\ 1-\pi & \text{if } x = b \end{cases}, b > a > 0$$ [Equation 2]

here, a and b denote positive message points.

4. The method of claim 3, wherein in order to maximize a difference between amounts of pieces of information of the receiving terminal and the wiretap terminal, the message point b is treated as a positive integer close to infinity.

* * * * *